US010030432B1

(12) United States Patent
Heirtzler, Jr. et al.

(10) Patent No.: US 10,030,432 B1
(45) Date of Patent: Jul. 24, 2018

(54) SYSTEM AND METHOD FOR WINDOW MOTION CONTROL

(71) Applicant: Ford Global Technologies, LLC, Dearborn, MI (US)

(72) Inventors: Paul L. Heirtzler, Jr., Northville, MI (US); Donald P. Iacovoni, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/628,127

(22) Filed: Jun. 20, 2017

(51) Int. Cl.

| | |
|---|---|
| ***G05B 5/00*** | (2006.01) |
| ***G05D 3/00*** | (2006.01) |
| ***H02H 7/08*** | (2006.01) |
| ***H02P 1/04*** | (2006.01) |
| ***E05F 15/73*** | (2015.01) |
| ***E05F 15/77*** | (2015.01) |

(52) U.S. Cl.
CPC .............. *E05F 15/73* (2015.01); *E05F 15/77* (2015.01)

(58) Field of Classification Search
CPC .................................. E05F 15/73; E05F 15/77
USPC .......................................................... 318/466
See application file for complete search history.

(56) References Cited

U.S. PATENT DOCUMENTS

| | | | | |
|---|---|---|---|---|
| 5,801,501 | A | 9/1998 | Redelberger | |
| 5,872,436 | A | 2/1999 | Bergmann et al. | |
| 6,952,087 | B2 | 10/2005 | Lamm | |
| 7,977,902 | B2 | 7/2011 | Batejat et al. | |
| 9,388,762 | B2 | 7/2016 | Kromer et al. | |
| 2011/0071735 | A1 * | 3/2011 | Witek | E05F 15/41 701/49 |
| 2012/0302219 | A1 * | 11/2012 | Vang | H04W 4/023 455/414.1 |
| 2014/0028440 | A1 * | 1/2014 | Takeuchi | G05B 1/01 340/5.61 |
| 2016/0200168 | A1 * | 7/2016 | Boyer | H04R 19/04 701/45 |
| 2017/0309098 | A1 * | 10/2017 | Watters | G07C 9/00309 |
| 2018/0037155 | A1 * | 2/2018 | Danowski | E05F 15/74 |

FOREIGN PATENT DOCUMENTS

| | | |
|---|---|---|
| DE | 10149578 A1 | 4/2003 |

* cited by examiner

*Primary Examiner* — Erick Glass
(74) *Attorney, Agent, or Firm* — Jason Rogers; Price Heneveld LLP

(57) ABSTRACT

A vehicle window control system is disclosed. The system comprises a window positioning device and a controller in communication with a mobile device. The controller is configured to identify a distance of the mobile device from the vehicle. In response to the distance being less than a distance threshold, the controller is configured to control the positioning device in a first mode. In response to the distance being greater than the distance threshold, the controller is configured to control the positioning device in a second mode.

20 Claims, 5 Drawing Sheets

SYSTEM AND METHOD FOR WINDOW MOTION CONTROL

FIELD OF THE DISCLOSURE

The present disclosure relates to a window control system, and more particularly relates to a control system for vehicles with power windows.

BACKGROUND OF THE INVENTION

Modern vehicles are increasingly manufactured with improved amenities and features. For example, features that previously were luxury items are now commonplace. Accordingly, manufacturers continue to improve amenities to provide for improved operation and customer satisfaction. The application provides for an improvement to an interface and control of a power window system to provide additional technical advancements thereby improving a customer experience.

SUMMARY OF THE INVENTION

According to one aspect of the present invention, a vehicle window control system is disclosed. The system comprises a window positioning device and a controller in communication with a mobile device. The controller is configured to identify a distance of the mobile device from the vehicle. In response to the distance being less than a distance threshold, the controller is configured to control the positioning device in a first mode. In response to the distance being greater than the distance threshold, the controller is configured to control the positioning device in a second mode.

According to another aspect of the present invention, a method for controlling a position of a vehicle window is disclosed. The method comprises wirelessly communicating via a window position controller with a mobile device. The method further comprises receiving a positioning instruction from the mobile device identifying a requested position of the vehicle window. Upon receiving the requested position, the method continues to identify a distance of the mobile device from the vehicle. In response to the distance being less than a distance threshold, the method controls a window positioning device in a first mode. In response to the distance being greater than the distance threshold, the method controls the window positioning device in a second mode.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The disclosure provides for a power window system configured to identify different modes of operation. In some embodiments, a mode of operation of the power window system may be determined based on a proximity of an operator of the power window system. Similarly, the disclosure may provide for different modes, which may be dependent on whether the system is operating while being supervised or unsupervised. For example, if the operator is controlling the power window system within a proximity range or distance, the system may control one or more windows of the vehicle with a first control mode. Additionally, if the operator is controlling the power window system outside the proximity range or distance, the system may control one or more windows of the vehicle with a second control mode. Accordingly, the disclosure may provide for a power window system configured to operate in a plurality of control modes.

Figure 1:
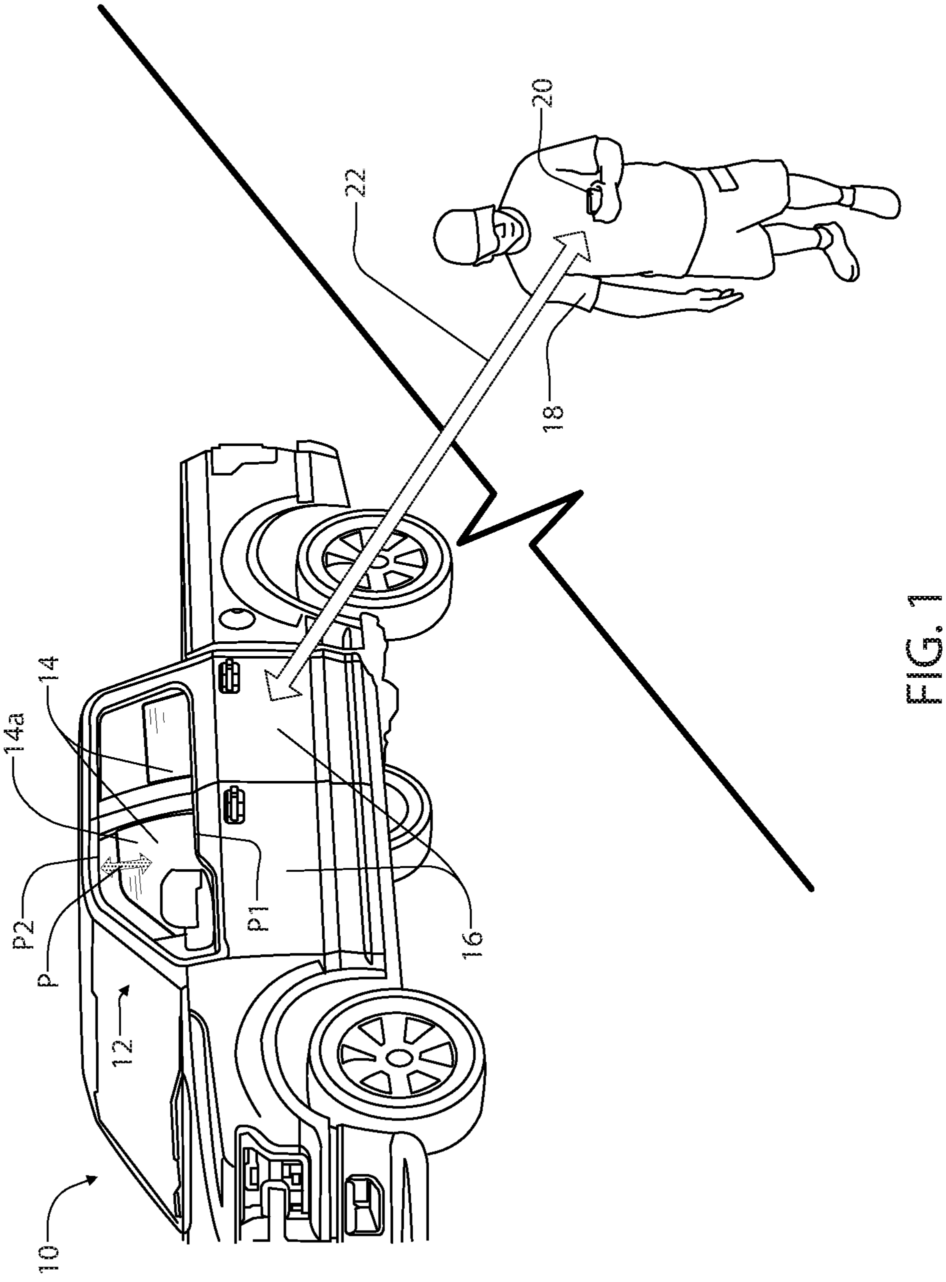
FIG. 1 is a projected view of a vehicle comprising a power window system demonstrating a remote operation mode.
Figure 2:
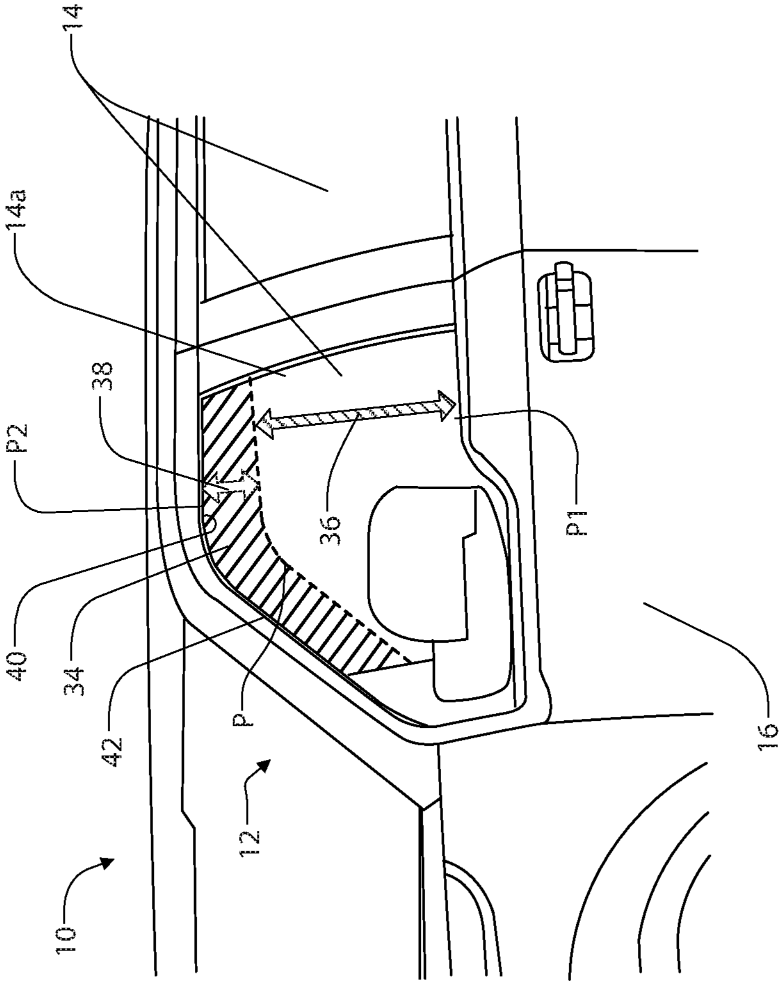
FIG. 2 is a detailed projected view of a window of a vehicle demonstrating a pinch zone.

Referring to FIGS. 1 and 2, diagrams of a vehicle 10 comprising a window control system 12 are shown. The vehicle 10 may comprise a plurality of windows 14 configured to be positioned by window positioning devices (e.g., electric motors), which may be disposed within door assemblies 16 of the vehicle 10. In this configuration, system 12 may control a position P of the windows 14 between an open position P1 (e.g. a completely open position) and a closed position P2 by communicating control signals to the positioning devices. In this way, the system 12 may be configured to adjust the position P of the windows 14 based on the control signals activating a positioning operation of the motors. In some embodiments, the system 12 may be controlled by an operator 18 via a mobile device 20. The mobile device 20 may be in communication with the system 12 via a wireless communication interface 22. In this configuration, the system 12 may provide for flexible control of the position P of each of the windows 14 independently based on one or more control signals received from the mobile device 20.

In various embodiments, the mobile device 20 may correspond to a portable computer, smartphone, key fob, personal data assistant (PDA), cellular telephone, or a variety of electronic devices. In such embodiments, the mobile device 20 may comprise a wireless communication circuit configured to communicate with a controller of the system 12 via the communication interface 22. In some embodiments, the controller may be operable to determine a distance between the mobile device 20 and the vehicle 10. In such embodiments, the controller may be operable to adjust a mode of operation or control mode of the system 12 based on the distance or proximity of the mobile device 20 to the vehicle 10. In this way, the controller may be configured to adjust one or more operating parameters of the power window system 12 in response to the distance range of the mobile device 20 from the vehicle 10. Further detailed discussion of the system 12 comprising the controller, the positioning devices, and the mobile device 20 is provided in reference to FIG. 5.

Figure 3:
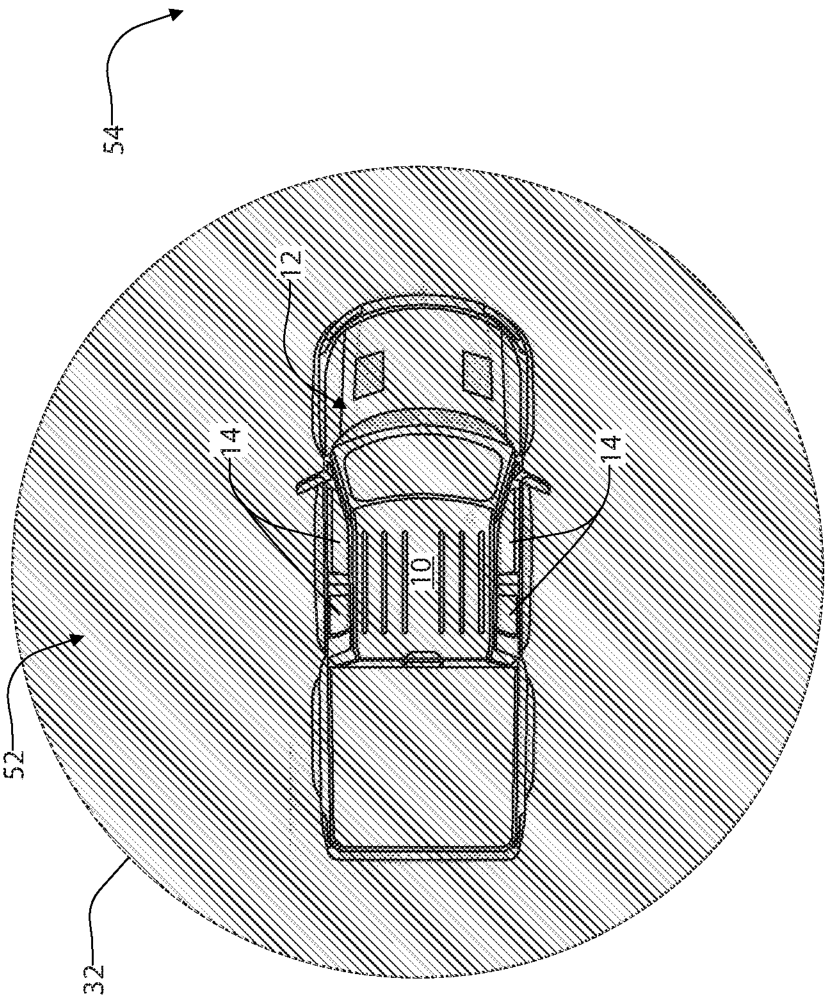
FIG. 3 is a top schematic view of a vehicle comprising a power window system demonstrating a proximity range for remote operation.

Referring now to FIGS. 1, 2, and 3, in some embodiment, the control modes may comprise a first control mode and a second control mode. The first control mode may correspond to a supervised control mode. The second control mode may correspond to an unsupervised control mode. The system 12 may be configured to selectively activate the first control mode or the second control mode for a positioning operation of each of the windows 14 based on a distance, proximity, or range of the mobile device 20 relative to the vehicle 10. For example, if the operator 18 is controlling the system 12 within a distance range 32, the system 12 may control one or more windows of the vehicle 10 via the first control mode. If the operator 18 is controlling the system 12 outside or beyond the distance range 32, the system 12 may control one or more windows of the vehicle 10 with a second control mode.

For example, if the controller of the system 12 receives an instruction or positioning instruction from the mobile device 20 to close a selected window 14*a* of the plurality of windows 14, the controller may identify whether the mobile device 20 is within the distance range 32. If the mobile device 20 is within the distance range 32, the controller may apply the first control mode. The first control mode may be configured to control the positioning device (e.g. electrical drive motor) of the selected window 14*a* to close the window 14*a* rapidly by supplying a first power level 58 to the positioning device of the selected window 14*a*. In this configuration, the system 12 may provide for the selected window 14*a* to close rapidly throughout the motion of the window 14*a*. Accordingly, the system 12 may control the motion of the window 14*a* to rapidly close based on the proximity of the mobile device 20 indicating that the motion of the window 14*a* is supervised by the operator 18. In this way, the system 12 ensures that the rapid motion of the selected window 14*a* is supervised to prevent a collision in an interference zone 34 of the window 14*a*. Though discussed in reference to the selected window 14*a*, the system 12 may similarly control each of the plurality of windows 14 alone or in any combination.

If the mobile device 20 is outside or beyond the distance range 32, the controller may apply the second control mode. The second control mode may be configured to control the positioning device of the selected window 14*a* to close the window 14*a* rapidly over a first operating range 36 and at a decreased rate of motion over a second operating range 38. The second operating range 38 may correspond to positions, wherein the window 14*a* is being positioned in the interference zone 34 between one of the windows 14 and a door seal 40 or window seal of the vehicle 10. During motion control of the selected window 14*a* in the first operating range 36, the controller may supply a first power level 58 to the positioning device thereby rapidly moving the window 14*a*. During motion control of the selected window 14*a* in the second operating range 38, the controller may supply a second power level 60 to the positioning device. The second power level 60 may slow the movement of the window 14*a* in the interference zone 34 and may also improve a collision detection of the controller in the event of an obstruction inhibiting the movement of the window 14*a*.

Accordingly, in the second control mode, the system 12 may provide for the selected window 14*a* to close at a first rate of motion or velocity throughout the first operating range 36 and at a second rate of motion throughout the second operating range 38. In this way, the system 12 may control the motion of the window 14*a* to limit a rate of motion as of the window 14*a* in the interference zone 34. Because the power and corresponding velocity of the positioning device is limited in the second operating range 38 of the second control mode, the controller may have an improved sensitivity to detect a blockage or obstruction in the interference zone 34. Accordingly, the system 12 may ensure that an interference or obstruction is detected at a higher level of sensitivity during unsupervised operation identified by the controller in response to the range of the mobile device 20 indicating that the motion of the window 14*a* is not supervised by the operator 18. A further detailed description of the control modes and corresponding control routines is discussed in reference to FIG. 4.

The detection of the obstruction in the interference zone 34 may be achieved by the controller by monitoring the current draw of the positioning device. The controller and the positioning device are demonstrated in FIG. 5. For example, as the result of an obstruction inhibiting the motion of the window 14*a*, the controller may be operable to detect a spike in the current draw of the positioning device (e.g. the motor). Based on the spike or increase in the current draw above a predetermined current threshold, the controller may control the window motor or positioning device to halt or reverse the motion of the window 14*a*. The second operating mode may provide for the controller to detect the obstruction of the window 14*a* with an increased level of sensitivity such that a maximum closing force of the window 14*a* in the second operating range 38 (e.g., the interference zone 34) is limited in comparison to the closing force in the first operating range 36. In this configuration, the controller may detect an obstruction to the motion of the window 14*a* with an increased sensitivity in the second operating range 38.

For example, when operating in the supervised mode 52 throughout a range of motion or the unsupervised mode 54 in the first operating range 36, the controller may supply the first power level 58 to the positioning device thereby rapidly moving the windows 14. During motion control in the unsupervised mode and the second operating range 38, the controller may supply a second power level to the positioning device. The second power level 60 may be less than the first power level 58 and may result in a decreased rate of motion of the windows 14. The slower movement of the second power level 60 may allow the controller to improve a system response to a detection of an obstruction in relation to the movement of the windows 14.

Figure 4A:
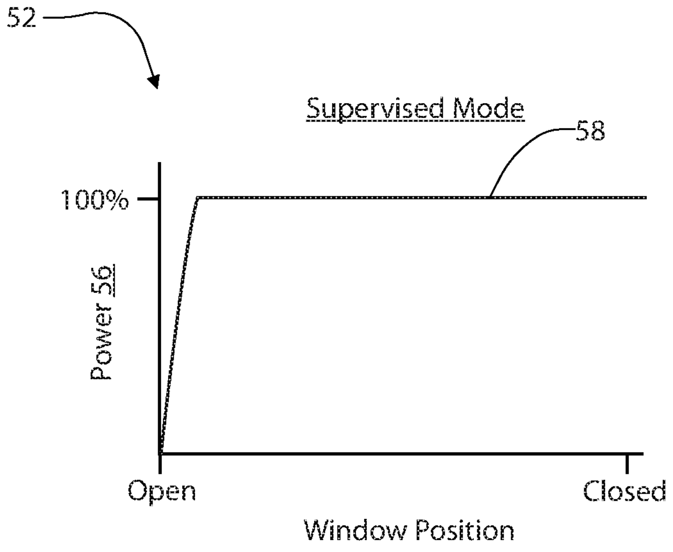
FIG. 4A is graphical representations of an operation of a power window system demonstrating an unsupervised mode of operation.
Figure 4B:
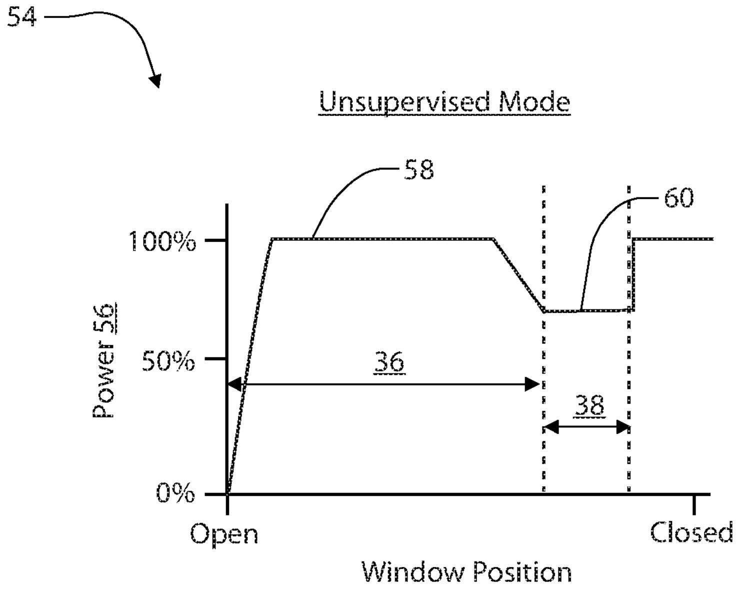
FIG. 4B is graphical representations of an operation of a power window system demonstrating a supervised mode of operation.

Referring now to FIGS. 4A and 4B, graphical representations of the system 12 operating in the supervised mode 52 and the unsupervised mode 54 are shown. As previously discussed, the controller may activate the supervised mode 52 in response to the mobile device 20 being within the distance range 32 and activate the unsupervised mode 54 in response to the mobile device 20 being outside the distance range 32. In this configuration, the system 12 is operable to identify whether the location of mobile device 20 indicates that the operator 18 is within the distance range 32. If the mobile device 20 is within the distance range 32, the system may identify that the operation of the system 12 is supervised by the operator 18 of the mobile device 20.

Referring to FIG. 4A, the power 56 supplied to the positioning device in the supervised mode 52 is shown in relation to the position P of the windows 14 between the open position P1 and the closed position P2. The power 56 supplied to the positioning device is shown on a relative scale to achieve specific performance characteristics during operation. When operating at the first power level 58, the system 12 may be operable to detect an obstruction allowing less than 100N of force to be applied to the obstruction having a stiffness of 20 N/mm. In simplified terms, this means that the controller of each of the windows 14 has approximately 5 mm of travel within which to detect an obstruction and cut power to the positioning device before the 100N limit is reached. Accordingly, in the supervised mode 52, the controller may supply the first power level 58 to the positioning device throughout the control of the motion of the windows 14 from the open position P1 to the closed position P2. At a typical window speed of 140 mm/s, 5 mm of travel equates to 0.036 seconds. It shall be understood that the specific power level supplied to the positioning device will depend on the specific vehicle, motor, and window design to which the system 12 is applied. For this reason, the operating principles of the system 12 are discussed herein for clarity.

Referring now to FIG. 4B, the power 56 supplied to the positioning device in the unsupervised mode 54 is shown in relation to the position P of the windows 14. The unsupervised mode 54 comprises the first operating range 36 and the second operating range 38. Over the first operating range 36, the controller controls the positioning devices of the windows 14 at the first power level 58. Accordingly, the controller controls the motion of the windows 14 over the first operating range 36, similar to the supervised mode 52. Over the second operating range 38, the controller controls the positioning devices of the windows 14 at the second power level 60. The second power level 60 is less than the first power level 58 and may provide for the controller to detect an obstruction in the interference zone 34 with an increased sensitivity. For example, the power 56 supplied to the positioning device when operating in the second operating range 38 and the unsupervised mode 54 may be less than 100N with an obstruction stiffness of 65 N/mm. Accordingly, in the interference zone 34, the controller may detect the obstacle within approximately 1.5 mm of travel of the window 14*a* or within a response time of 0.011 seconds. In this way, the controller may detect the obstruction with an increased sensitivity when the window 14*a* travels through the interference zone 34, which may comprise a region extending approximately 25 mm to 50 mm from a door seal 40 or window seal of the vehicle 10.

As previously discussed, the first power level 58 may be less than the second power level 60. For example, the second power level 60 may be at least 10% less than the first power level 58. In some embodiments, the second power level 60 may be at least 15% less than the first power level 58. Additionally, in an exemplary embodiment, the second power level 60 may be at least 25% less than the first power level 58. The power levels 56 as discussed herein may correspond to the rate of electrical energy delivered to the positioning devices or motors of the windows 14. Accordingly, the power 56 may be adjusted by a number of methods, such as changing a steady state voltage or duty cycle of the energy supplied to the positioning devices. In this way, the disclosure provides to a flexible solution that should not be limited unless explicitly stated in the claims.

Still referring to FIGS. 4A and 4B, the system 12 may be configured to assign the interference zone 34 to extend approximately 25 mm from a door seal 40, window seal, or an opening perimeter 42 of the window 14 relative to the approaching window 14. The specific distance or range of the interference zone 34 may be adjusted to suit desired operating characteristics. The control modes (e.g., the supervised mode 52 and the unsupervised mode 54) may correspond to operating routines comprising power profiles controlled based on the position P of the windows 14. The position of each of the windows 14 may be identified by a motion controller, position sensor, or a variety of position detection mechanisms or methods commonly utilized to identify a position of an object maneuvered or positioned by a motor. Accordingly, the system 12 may identify the position of each of the windows such that the control modes can be accurately activated of over the first operating range 36 and the second operating range 38.

Figure 5:
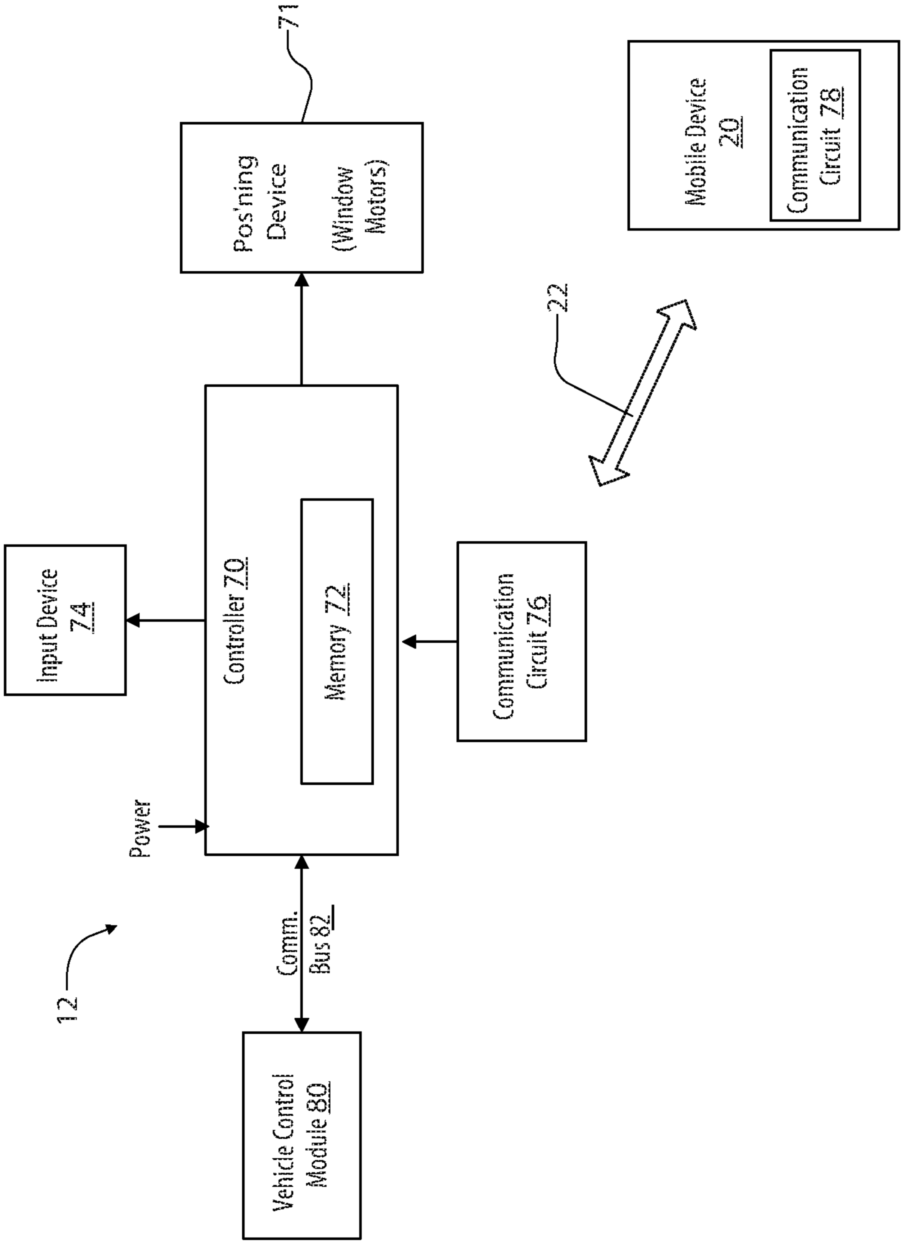
FIG. 5 is a block diagram of a door assist system configured to control a positioning operation of the door in accordance with the disclosure.

Referring now to FIG. 5, a block diagram of the power window system 12 is shown in communication with the mobile device 20. The system 12 may comprise a controller 70 configured to control the window positioning devices. In an exemplary embodiment, the window positioning devices 71 may correspond to window motors. In such embodiments, the controller 70 may comprise one or more drive circuits configured to communicate control signals to control the window motors 71. In this configuration, the controller 70 may control each of the window motors 71 based on one or more positioning instructions received from the mobile device 20.

Additionally, the controller 70 may be configured to control various components and/or integrated circuits of the system 12. The controller 70 may include various types of control circuitry, digital and/or analog, and may include a microprocessor, microcontroller, application-specific integrated circuit (ASIC), or other circuitry configured to perform various input/output, control, analysis, and other functions to be described herein. The controller 70 may be in communication with a memory 72 configured to store one or more routines as discussed herein. The memory 72 may comprise a variety of volatile and non-volatile memory formats.

The controller 70 may be coupled to an input device 74, which may comprise one or more window control switches, soft keys, knobs, dials, etc. Additionally, the window system 12 may comprise various data devices, including, but not limited to, the input device 74, transducers, and/or sensors configured to detect inputs to control the window system 12. In this way, the system 12 may be operated remotely in response to the instructions or signals received from the mobile device 20 and/or in response to the input device 74, which may be incorporated in the vehicle 10.

In an exemplary embodiment, the window system 12 may comprise the communication circuit 76 that may be configured to communicate with the mobile device 20 and/or any device connected via a compatible communication network or interface 22. The communication interface 22 may correspond to various forms of wireless communication, for example Bluetooth, Bluetooth Low-Energy (BT-LE), Near Field Communication (NFC), and/or the like. Examples of standards related to NFC include International Organization for Standardization (ISO) 18000-3, ISO 13157, and the like, and examples of standards related to BT-LE include The Institute of Electrical and Electronic Engineers (IEEE) 802.15.1, and the like. Additionally, the communication interface 22 may be configured to operate using one or more of a plurality of radio access technologies including one or more of the following: Long Term Evolution (LTE), wireless local area network (WLAN) technology, such as 802.11 WiFi, and the like, and other radio technologies as well.

In an exemplary embodiment, the controller 70 may determine if the mobile device 20 is within the distance range 32 based on the wireless signals of the wireless communication interface 22. For example, the controller 70 may identify the proximity of the mobile device 20 based on a signal strength of the wireless signal communicated via the wireless communication interface 22. If the signal strength is greater than a predetermined threshold, the controller 70 may identify that the mobile device 20 is within the distance range 32 and control the system 12 in the supervised mode 52. If the signal strength is less than the predetermined threshold, the controller 70 may identify that the mobile device 20 is outside the distance range 32 and control the system 12 in the unsupervised mode 54.

In some embodiments, the mobile device 20 may also be operable to connect to a server, the internet, and/or a portal configured to receive or communicate data related to the system 12. In this configuration, the controller 70 may communicate with the server via the mobile device 20 to receive software updates, security information, and/or any form of information related to the vehicle 10 and/or the system 12. For example, the mobile device 20 may comprise one or more communication circuits 78 similar to those discussed herein to communicate with the remote server.

The mobile device 20 may comprise a user interface configured to receive a positioning instruction from the operator 18. For example, the user interface may comprise one or more switches, buttons, and/or soft keys (e.g., configurable keys on a touch display), which may identify a position control for each of the vehicle windows 14. Accordingly, the operator 18 may enter one or more window positioning instructions into the mobile device 20. Upon receiving the positioning instructions, the mobile device 20 may communicate the instructions to the controller 70 via the communication interface 22. In this configuration, the mobile device 20 is operable to receive a variety of control instructions from the operator 18 to control the window system 12 via the communication interface 22.

In some embodiments, the mobile device 20 may be configured to receive voice commands via a microphone, which may be incorporated therein. The voice commands may comprise one or more instructions configured to identify positioning instructions for the windows 14. In such embodiments, a processor of the mobile device 20 may be configured to receive the voice command as an audio signal from the microphone. The mobile device 20 may then perform a voice recognition, transformation and/or translation to identify a control message indicated in the voice command. In such embodiments, the mobile device 20 may comprises one or more processing modules configured to analyze voice data and convert the voice data into syntax. Additionally, the mobile device 20 may comprise parsing logic for determining command information to identify the control message from the syntax.

In response to the voice command, the mobile device 20 may send the control message or signal to the controller 70 via the communication interface 22. In response to receiving the one or more positioning instructions from the mobile device 20, the controller 70 may control the vehicle windows 14 such that they are oriented according to the positioning instructions. Additionally, the controller 70 may be configured to identify the distance range 32 of the mobile device 20 corresponding to the location from which the positioning instruction was received by the mobile device 20. In this way, the controller 70 may identify whether the positioning instruction should be processed in the supervised mode 52 or the unsupervised mode 54 and control the system 12 according to the mode 52 or 54.

In some embodiments, the window control system 12 may further be in communication with a variety of vehicle systems. For example, the window system 12 may be in communication with a vehicle control module 80 via a communication bus 82. In this configuration, the system 12 may be configured to control the windows 14 based on a variety of vehicle operating conditions, settings, and/or user preferences. Some examples of vehicle operating conditions may include an ignition condition, gear selection, heading direction, temperature condition, and a variety of conditions that may be monitored by systems of the vehicle 10. Accordingly, the system 12 may provide for a variety of control modes and routines based on the conditions communicated via the communication bus 82.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle window control system, comprising:

a window positioning device; and a controller in communication with a mobile device, wherein the controller is configured to:

identify a distance of the mobile device from the vehicle;

in response to the distance less than a distance threshold, control the positioning device in a first mode; and in response to the distance greater than the distance threshold, control the positioning device in a second mode.

2. The system according to claim 1, wherein the controller comprises a communication circuit configured to wirelessly communicate with the mobile device via a communication interface.

3. The system according to claim 2, wherein the controller is configured to detect the distance of the mobile device based on a signal of the communication interface.

4. The system according to claim 1, wherein the mobile device comprises a user interface configured to receive an input configured to indicate a control for the window positioning device.

5. The system according to claim 1, wherein the window positioning device is configured to control a position of a vehicle window from an open position to a closed position.

6. The system according to claim 5, wherein the controller is configured to receive a positioning instruction from the mobile device identifying a requested position of the vehicle window.

7. The system according to claim 6, wherein the controller is further configured to position the vehicle window in response to the requested position.

8. The system according to claim 1, wherein the first mode is a supervised mode.

9. The system according to claim 1, wherein the second mode is an unsupervised mode.

10. The system according to claim 1, wherein the controller is configured to control the window positioning device to position a vehicle window over a first operating range and a second operating range.

11. The system according to claim 10, wherein the first operating range extends from the window in a completely open position to an interference zone.

12. The system according to claim 11, wherein the second operating range extends from the interference zone to a closed position.

13. The system according to claim 12, wherein the interference zone comprises a region within 50 mm from an opening perimeter of the window to the window approaching a closed position.

14. The system according to claim 12, wherein the controller is further configured to:

in the first mode, supply a first power level to the window positioning device when the window is positioned in the first operating range and the second operating range.

15. The system according to claim 14, wherein the controller is further configured to:

in the second mode, supply a first power level to the window positioning device when the window is positioned in the first operating range and a second power level to the window positioning device when the window is positioned in the second operating range.

16. The system according to claim 15, wherein the first power level is greater than the second power level.

17. The system according to claim 1, wherein the window positioning device is an electric motor.

18. A method for controlling a position of a vehicle window, comprising:

wirelessly communicating via a window position controller with a mobile device;

receiving a positioning instruction from the mobile device identifying a requested position of the vehicle window;

identifying a distance of the mobile device from the vehicle upon receiving the requested position;

in response to the distance less than a distance threshold, controlling a window positioning device in a first mode; and in response to the distance greater than the distance threshold, controlling the window positioning device in a second mode.

19. The method according to claim 18, further comprising:

in the first mode, supplying a first power level to the window positioning device when the window is positioned in a first operating range and a second operating range.

20. The system according to claim 19, further comprising:

in the second mode, supplying a first power level to the window positioning device when the window is positioned in the first operating range and a second power level to the window positioning device when the window is positioned in the second operating range.

* * * * *